US012427788B2

(12) United States Patent
Towe et al.

(10) Patent No.: US 12,427,788 B2
(45) Date of Patent: Sep. 30, 2025

(54) THERMAL OVERWRITE SECURE INDIRECT THERMAL PRINTING

(71) Applicant: TOSHIBA TEC KABUSHIKI KAISHA, Tokyo (JP)

(72) Inventors: Brad W. Towe, Versailles, KY (US); Michael W. Lawrence, Lexington, KY (US)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 69 days.

(21) Appl. No.: 18/122,066

(22) Filed: Mar. 15, 2023

(65) Prior Publication Data

US 2024/0308238 A1 Sep. 19, 2024

(51) Int. Cl.
*B41J 2/325* (2006.01)
*B41J 33/26* (2006.01)

(52) U.S. Cl.
CPC ............... *B41J 2/325* (2013.01); *B41J 33/26* (2013.01)

(58) Field of Classification Search
CPC ..... B41J 2/32; B41J 2/325; B41J 2/315; B41J 33/16; B41J 33/24; B41J 33/26; B41J 2202/30; B41J 2202/34; B41J 2202/37; B41J 15/04; B41J 15/046; B41J 15/048; B41J 11/02; B41J 11/04; B41J 11/0024; B41J 3/60; B41J 17/38; B41J 35/38; B41J 17/00; B41J 17/02
USPC ........................................ 347/213, 215, 217
See application file for complete search history.

(56) References Cited

U.S. PATENT DOCUMENTS 4,511,902 A * 4/1985 Nagashima ............ G01D 15/10 400/198
4,788,559 A * 11/1988 Ende ........................ B41J 17/38 346/21
10,926,551 B2 * 2/2021 Kuroda .................... B41M 5/44

FOREIGN PATENT DOCUMENTS

JP 2003341118 A * 12/2003
JP 2005305800 A * 11/2005
JP 2017064999 A * 4/2017

OTHER PUBLICATIONS

JP-2003341118 A English translation (Year: 2003).*
JP-2005305800 A English translation (Year: 2005).*
JP-2017064999 A English translation (Year: 2017).*

* cited by examiner

*Primary Examiner* — Leslie J Evanisko
*Assistant Examiner* — Thomas Ray Knief
(74) *Attorney, Agent, or Firm* — Kim & Stewart LLP

(57) ABSTRACT

An indirect thermal transfer printer applies images to label stock with the use of heat activated transfer ribbon. Once an image is printed, a negative of the printed image remains on the exposed transfer ribbon. Heat is applied to the exposed transfer ribbon as it is spooled to obliterate the negative, fuse the ribbon to previously exposed and spooled ribbon, or both.

6 Claims, 4 Drawing Sheets

THERMAL OVERWRITE SECURE INDIRECT THERMAL PRINTING

TECHNICAL FIELD

This application relates generally to a label printing system. The application relates more particularly to protecting information during indirect thermal label printing.

BACKGROUND

Label printers typically print indicia, such as mailing addresses, onto a label that has adhesive on one side. The adhesive is generally covered with a release paper, or liner, that is removed prior to the label being placed onto the desired object, such as a letter or a box for shipping. Label printing may be done conventionally, such as with a printhead for deposition of toner or ink. Label printing may also be done by thermal printing.

There are two basic systems for thermal printing, direct thermal and thermal transfer. Both systems use a thermal printhead and an image receiving surface. Direct thermal printing uses chemically treated, heat-sensitive media that blackens when it passes under the thermal printhead. Thermal transfer or indirect printing uses a heated ribbon to produce durable, long-lasting images on a wide variety of materials.

Direct thermal printing is simple, but bears disadvantages. A label printed on thermal paper can discolor when exposed to sufficient heat, obliterating all or some of the printed content. Thermal transfer printing is not so affected, and generally provides a cleaner image.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Dual sided label printing allows for providing information, such as shipping address on a top side of a label. Additional information, such as a packing list or a return label, can be printed on the reverse side, saving printing and media costs. Commercially available dual sided label printers include models such as the BA410T series and BA420T series offered by Toshiba TEC. These models provide direct thermal printing on one side of a label and indirect or thermal transfer printing on the other side.

Example embodiments herein are directed to label printers that print individual labels from label stock removed from a spool or fanfold media. It is to be understood that any suitable printing system may be used. Thermal transfer printing has efficiency advantages over direct thermal printing. Thermal transfer printing requires transferring an image via a print ribbon. Once printing is done, exposed print ribbon can be wound on a spool or roller which can then be discarded.

Exposed print ribbon media includes a negative image corresponding to each printed label. If one were to obtain a discarded roll of exposed print ribbon, one could discern information about each label. For shipping labels, such information may include customer information valuable to a competitor. For prescription labels, such information may include private healthcare information, such as identifying a patient and their associated medication and dosing. This could result in a breach of privacy, rendering the labeler civilly liable. The labeler could also be criminally liable for breaches that include identifiable personal medical information in accordance with the U.S. Federal Health Insurance Portability and Accountability Act (HIPPA).

Figure 1A:
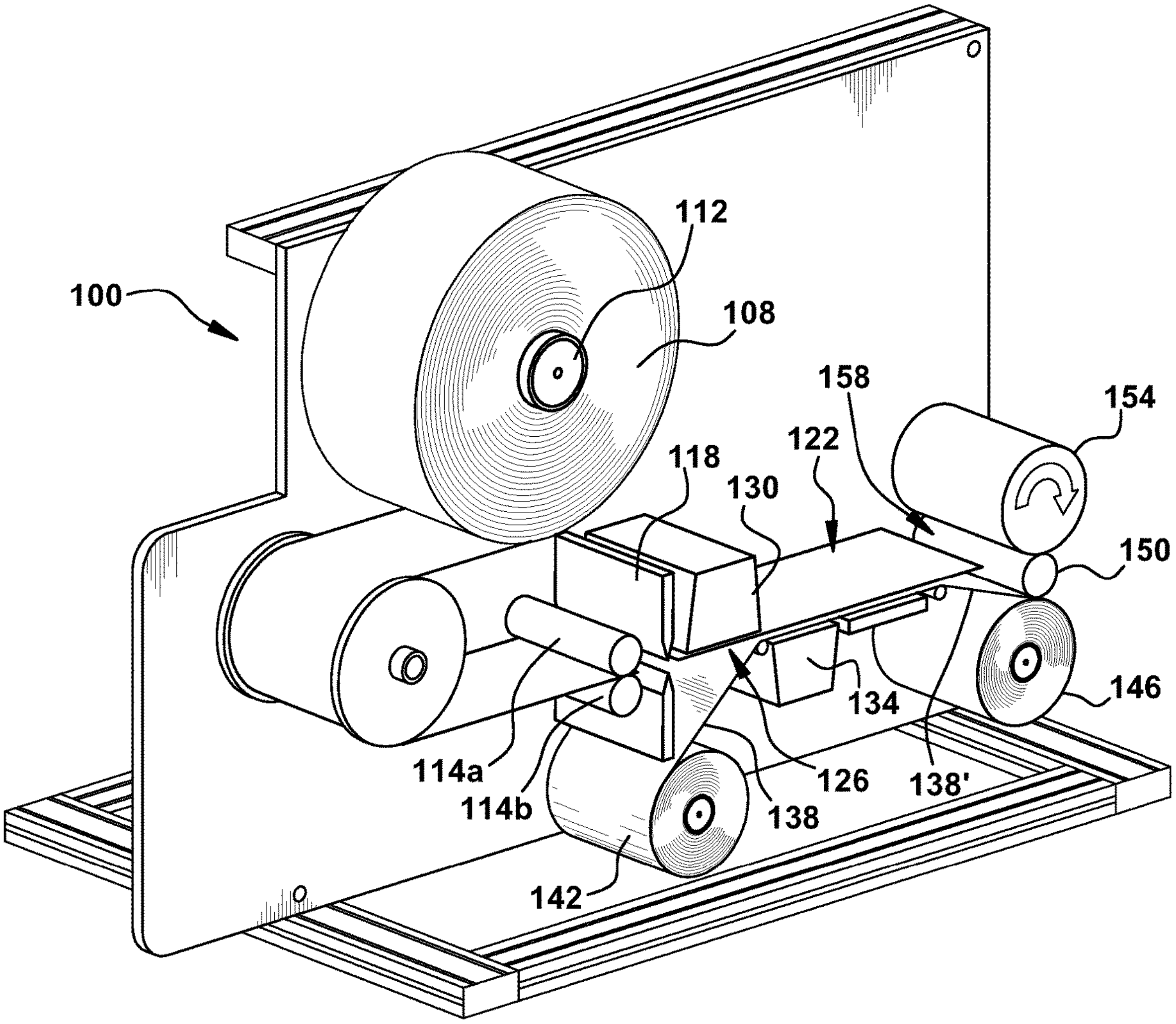
FIG. 1A is a first view of an example embodiment of a thermal overwrite secure indirect thermal printing system.
Figure 1B:
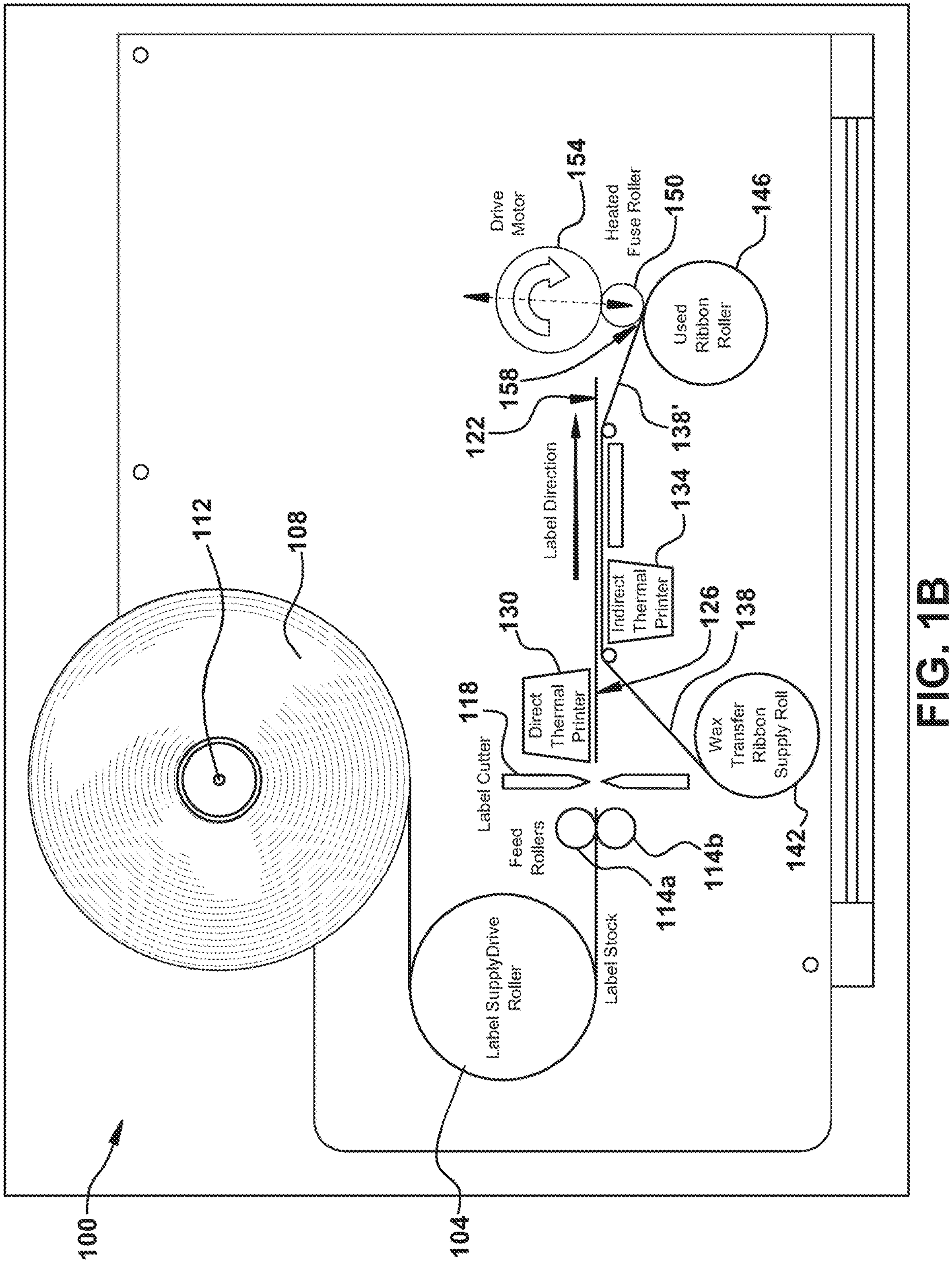
FIG. 1B is a second view of an example embodiment of a thermal overwrite secure indirect thermal printing system.

In accordance with the subject application, FIGS. 1A and 1B illustrate an example embodiment of a thermal overwrite secure indirect thermal printing system 100. The printing system 100 includes a transfer label supply roller 104 that receives thermal print media 108 from label supply roll 112. Print media 108 is removed by cooperative feed rollers 114*a* and 114*b*. Labels are separated by label cutter 118 for printing. In the illustrated example, thermal printing can be accomplished on both sides of label stock. Direct thermal printing cannot be used on both sides insofar as, if attempted, the front and back images would intermesh due to application of first and second thermal printheads to opposing sides of the same media. This is avoided by use of direct thermal printing on a top side 122 of print media 108 and thermal transfer printing on bottom side 126. Direct thermal printer 130 provides an image to top side 122 while indirect thermal printer 134 transfers an image to the bottom side 126 by application of heat to transfer ribbon 138 received from supply roll 142.

After printing, exposed transfer ribbon 138' is wound onto used ribbon roller 146 and, while exposed, is contacted by heated fuse roller 150, heated by any suitable means, such as electrical resistance or induction heating. Fuse roller 150 is suitably rotated by contact with counter-rotating drive motor 154. In the illustrated example, exposed transfer ribbon 138' contacts used ribbon roller 146 and fuse roller 150 at nip 158. Fuse roller 150 is heated to a suitable temperature at which newly spooled exposed transfer ribbon is erased and/or fused to previously exposed and heated transfer ribbon, rendering any latent images to be obliterated and/or unreadable.

Figure 2:
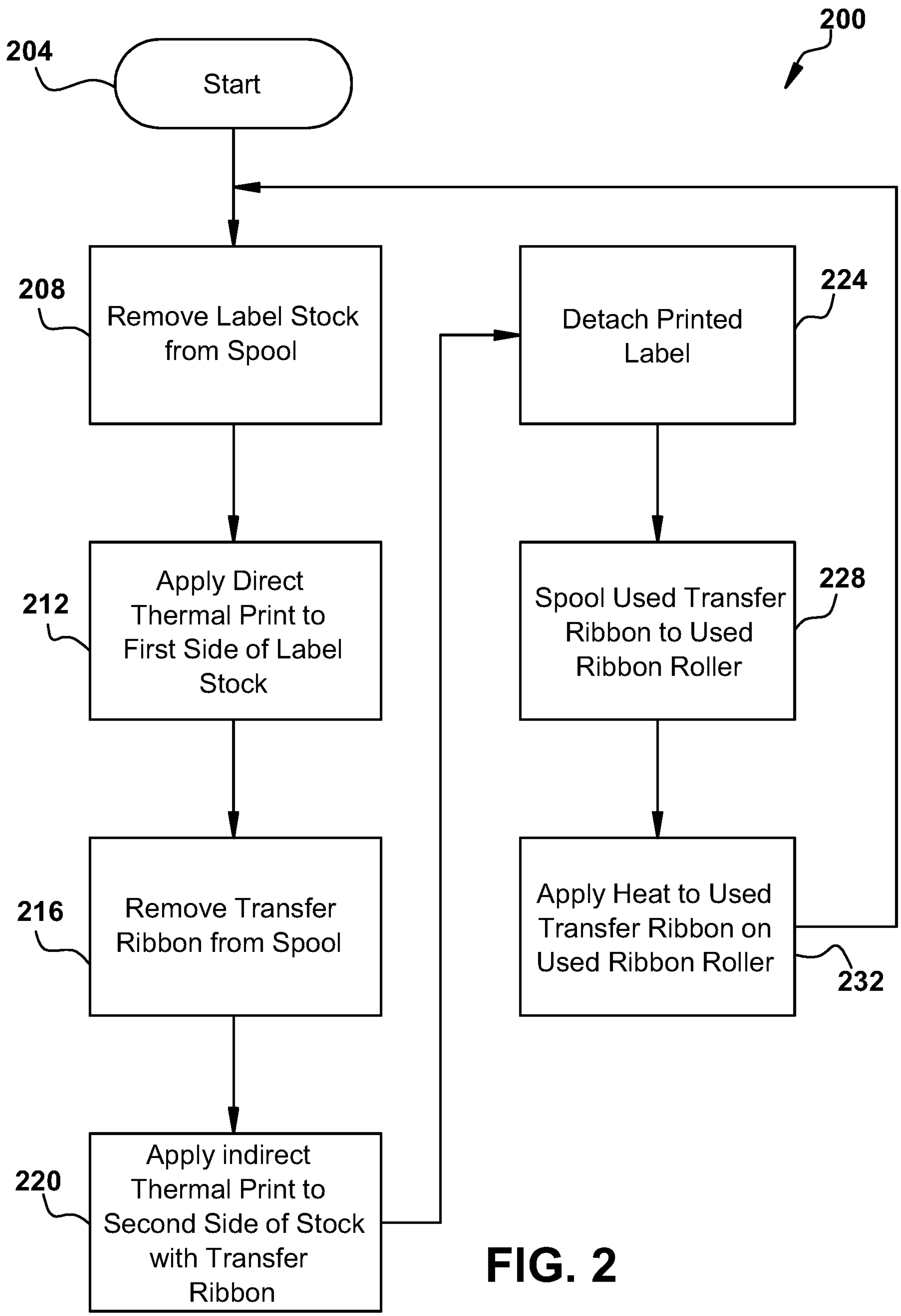
FIG. 2 illustrates a flowchart of an example embodiment for a secure indirect thermal printing system.

FIG. 2 illustrates a flowchart of an example embodiment for a secure indirect thermal printing system 200. The system commences at block 204 and proceeds to block 208 where a web of thermal label stock is removed from a supply spool. Direct thermal printing is applied to a first side of the label stock at block 212. Thermal transfer ribbon is removed from a supply spool at block 216, and an image is transferred from it to a second side of the label stock at block 220. Individual labels are detached at block 224 and exposed transfer ribbon is spooled at block 228. Heat is applied to the exposed transfer ribbon at block 232, obliterating and/or fusing some or all of any remaining image. The process returns to block 208 and repeats for subsequent labels.

Figure 3:
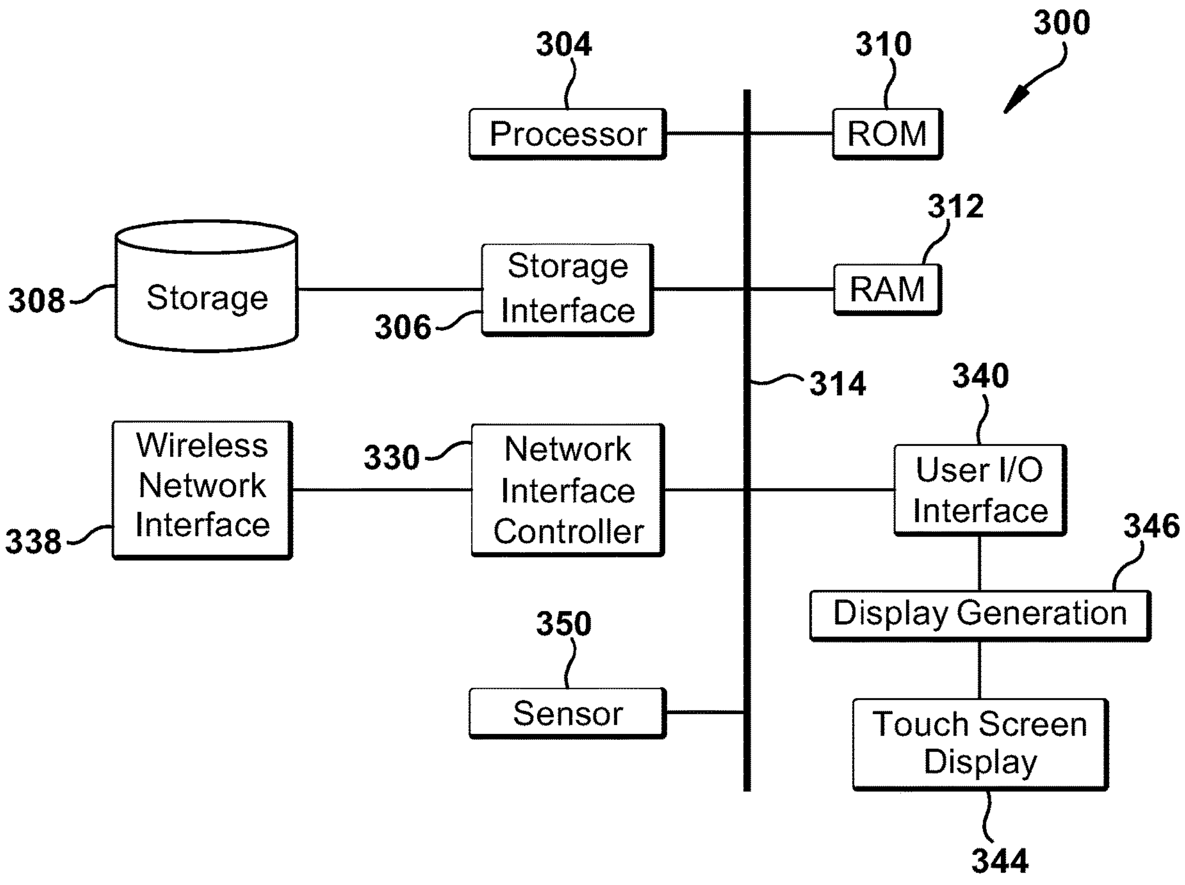
FIG. 3 is an example embodiment of a digital device such as a controller for a printer system.

Turning now to FIG. 3, illustrated is an example of a digital device system 300 suitably comprising print controller suitable for operation of the printer of FIGS. 1A and 1B. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to a print server is via a data network, such as a local area network (LAN), a wide area network (WAN), which may comprise the Internet, or any suitable combination thereof. A digital data connection is also suitably directly with a print server, such as via Bluetooth, optical data transfer, Wi-Fi direct, or the like.

Processor 304 is also in data communication with a user input/output (I/O) interface 340 which provides data communication with user peripherals, such as touch screen display 344 via display generator 346, as well as keyboards, control buttons, mice, track balls, touch screens, or the like. Processor 304 is also in data communication with sensor 350, suitably comprised of non-contact reflective object sensor for sensing slack in a continuous ribbon of unprinted labels. It will be understood that functional units are suitably comprised of intelligent units, including any suitable hardware or software platform.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:

a thermal transfer printer;

a transfer ribbon supply roll configured to feed a heat activated transfer ribbon to the thermal transfer printer, the thermal transfer printer configured to transfer an image from the transfer ribbon to an associated label stock so as to generate an exposed portion of the transfer ribbon including a negative image of the transferred image;

a used ribbon roller;

a drive motor configured to cause the transfer ribbon to move through the thermal transfer printer and direct the exposed portion of the transfer ribbon to the used ribbon roller; and a heated fuse roller provided between the drive motor and the used ribbon roller and configured to erase the negative image on the exposed portion of the transfer ribbon and fuse the exposed portion of the transfer ribbon to a portion of the transfer ribbon previously fused around the used ribbon roller.

2. The system of claim 1, wherein the drive motor is in contact with the heated fuse roller and configured to rotate the heated fuse roller.

3. The system of claim 2, wherein the exposed portion of the transfer ribbon being moved comes in contact with the used ribbon roller first at a nip formed between the heated fuse roller and the used ribbon roller.

4. A method comprising:

feeding a heat activated transfer ribbon from a transfer ribbon supply roll to a thermal transfer printer;

moving the transfer ribbon through the thermal transfer printer;

transferring, via the thermal transfer printer, an image from the transfer ribbon to an associated label stock so as to generate an exposed portion of the transfer ribbon including a negative image of the transferred image;

directing the exposed portion of the transfer ribbon to a used ribbon roller; and with use of a heated fuse roller provided between a drive motor and the used ribbon roller, erasing the negative image on the exposed portion of the transfer ribbon and fusing the exposed portion of the transfer ribbon to a portion of the transfer ribbon previously fused around the used ribbon roller.

5. The method of claim 4, wherein the drive motor is in contact with the heated fuse roller, which is rotated by the drive motor.

6. The method of claim 5, wherein the exposed portion of the transfer ribbon being moved comes in contact with the used ribbon roller first at a nip formed between the heated fuse roller and the used ribbon roller.

* * * * *